UNITED STATES PATENT OFFICE.

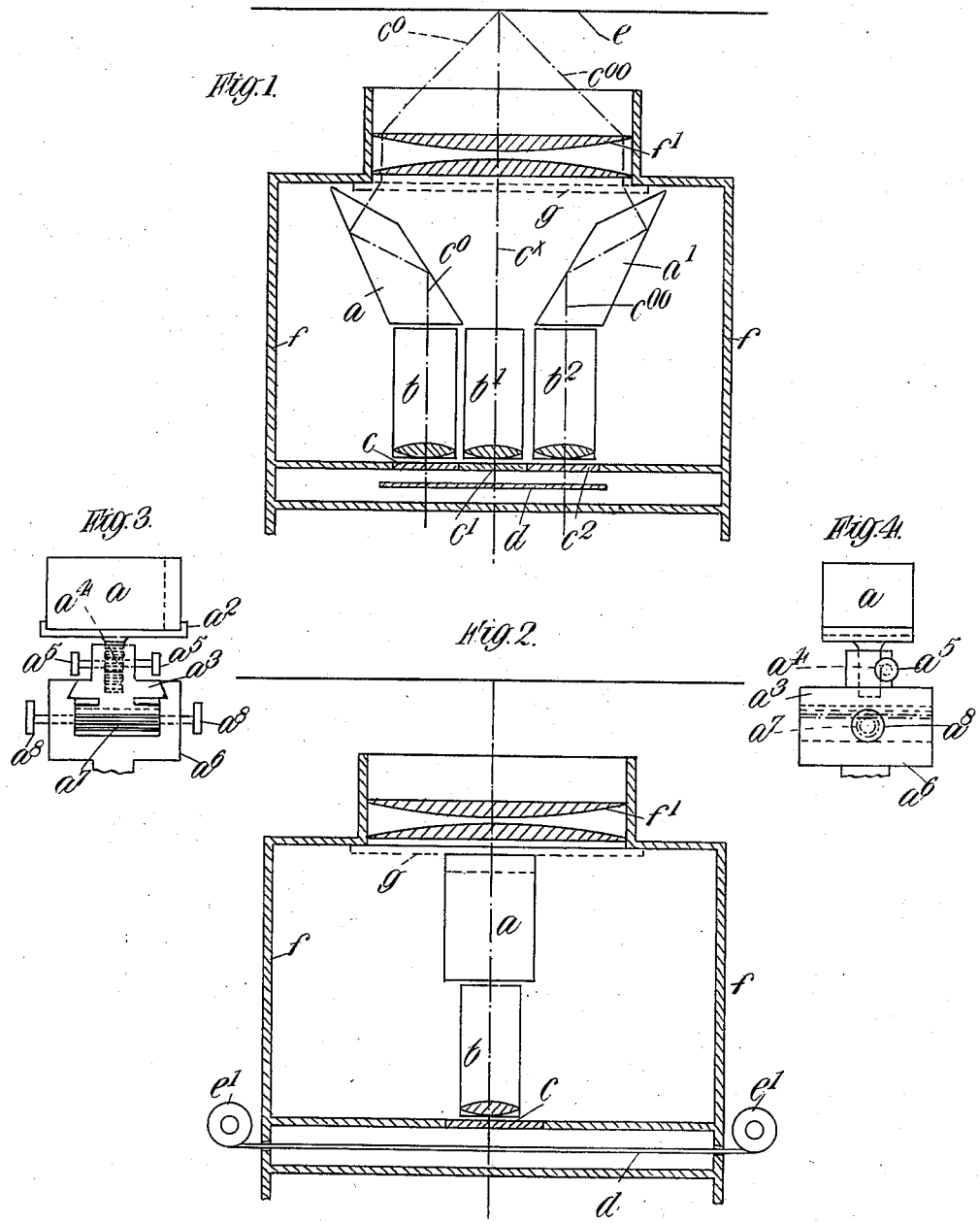

BENJAMIN JUMEAUX, OF SOUTHWICK, NEAR BRIGHTON, ENGLAND.

APPARATUS FOR THE OPTICAL PROJECTION OF COLORED IMAGES.

944,787.

Specification of Letters Patent. Patented Dec. 28, 1909.

Application filed February 5, 1907. Serial No. 355,851.

*To all whom it may concern:*

Be it known that I, BENJAMIN JUMEAUX, M. R. C. S., L. R. C. P., a subject of the King of Great Britain, residing at Southwick, near Brighton, in the county of Sussex, England, have invented certain new and useful Improvements Relating to Apparatus for the Optical Projection of Colored Images, of which the following is a specification.

This invention relates to apparatus for the optical projection of colored images, the objects being to heighten the effectiveness of the apparatus and to remove some of the defects heretofore existing therein.

In the method of projection in which one lens has been used to project all three color records, it has been proposed to employ in front of such lens single and double reflectors or mirrors for superimposing the images from such color records or positives, but these means are not found to be attended with entire success owing to the mirrors giving multiple reflections and thereby marring the effect of the projected images, besides which there is much loss of light. Moreover, when one lens is used for projection of all three records in combination with mirrors for causing the super-position of the images of such records, it is difficult to adjust the mirrors in the path of the beam from one such record without interfering with the beam from another record. Prisms of the refracting type have, moreover, been proposed for use with what are known as animated pictures in colors; and prisms of the "Fresnel rhomb" type have also been proposed for the purpose of superimposing and splitting up images in apparatus of the type referred to with the result that the incident axial ray emerges parallel to itself.

According to the present invention I employ a separate projecting lens for each color record and I superimpose the images thus formed on the screen by means of a form of reflecting prism or prisms having faces arranged at such angle or angles as may be necessary to cause the light rays to converge to any desired point. The type of prism is therefore such as to give two internal reflections and is designed so that the faces of the prism at which the beam enters and emerges are normal to such entering and emerging beam.
The present invention consists in so modifying the prisms of the Fresnel type above referred to as to cause the rays which enter parallel to the axis of the lens to emerge making an angle with that axis and so make it possible to correctly superpose the images. The prism or prisms may be mounted in suitable holders or carriers adapted for adjustment in a vertical and horizontal plane, *i. e.* the prism or prisms may be adapted for universal movement. By these means the prisms may be adjusted so as to permit the superimposing of the images to be effected with accuracy. When projecting three color records with three projecting lenses as above described I preferably project one image direct on to the screen without the intervention of a prism and then cause the other two images to register with the first by means of prisms arranged in front of the other two lenses.

The prism may be conveniently arranged with respect to the lenses, and to the positives or records. The color screens may be placed before or behind the positives, before, behind, or inside the lens, before or behind the prisms; or the prisms may themselves be of a suitable color.

In order that the invention may be clearly understood and readily carried into effect I will proceed to describe the same with reference to the examples illustrated in the accompanying drawing in which:—

Figure 1 represents diagrammatically a sectional view of the improved apparatus. Fig. 2 is a corresponding view at right angles to Fig. 1 showing the rollers pertaining to the film. Figs. 3 and 4 represent detail views of the carrier adjusting mechanism.

The prisms $a$ $a'$ are mounted in suitable holders or carriers $a^2$ (Figs. 3 and 4) so as to be capable of adjustment in a vertical and horizontal plane. The carriers $a^2$ are mounted on the slides $a^3$ and can be adjusted vertically relatively thereto by rack and pinion mechanism $a^4$ operated by the milled heads $a^5$. The slides $a^3$ are mounted on the supports $a^6$ and are capable of being adjusted horizontally by means of rack and pinion mechanism $a^7$ operated by the milled heads $a^8$.

Behind the prisms are arranged the lenses $b$, $b'$, $b^2$ and behind these again the color screens $c$ $c'$ $c^2$, say, green, blue and red respectively; $d$ being the film carrying the positives or subjects to be projected on the screen $e$ and adapted for being unrolled and rolled upon rollers $e'$ $e'$. The body of the camera is indicated at $f$; the usual condenser $f'$ being employed as will be well understood. A suitable shutter $g$ also indicated in dotted lines may be arranged for operation as required. The aforesaid prisms $a$ $a'$, are formed with faces arranged at such angle or angles as may be found necessary to cause the light rays to converge to any desired point. In the example illustrated the face of the prism at the base is normal to the incident rays while the side faces are so arranged, convergently as to cause a double reflection; the variation of the angle between the emergent face and the base being in direct proportion to the variation required to superpose the emergent rays; the face remote from the base is arranged at right angles or thereabout to the emergent rays. It will be seen that the blue light rays take a direct line or course as indicated by the line $c^x$ while the green light rays and the red light rays take a line or course, as indicated by the lines $c^0$ and $c^{00}$ respectively which represent the angles of incidence and reflection in each case; the center lines only being shown for the sake of clearness. Of course the angles of the faces pertaining to the prisms will vary according to requirements and to the distance of the screen and the degree of convergence necessary but by means of the present invention a correct projection and superimposing of the images is insured; the colors being truly registered and blurring effects entirely obviated.

It will thus be seen that the employment of reflecting prisms in the projection of a colored subject in the manner hereinbefore described enables a superimposing of the two outer pictures to be obtained upon the center or inner picture.

It will be further understood that in obtaining the negatives prisms are not employed but the negatives are taken by means of three lenses mounted as closely as possible so as to reduce stereoscopic effects and that three color screens are disposed between the subject and the film; the three negatives being taken simultaneously on the film.

What I claim and desire to secure by Letters Patent of the United States is:—

1. In apparatus for the optical projection of colored pictures by the superimposition of a plurality of mono-chromic images, the combination of doubly reflecting prisms having non-parallel faces, lenses arranged behind the said prisms, and color screens disposed behind the lenses.

2. In apparatus for the optical projection of colored images, the combination of doubly reflecting prisms of the Fresnel type having the face at the base normal to the incident rays, the side faces convergently arranged to cause a double reflection, the variation of the angle between the emergent face and the base being in direct proportion to the variation required to superimpose the emergent rays and the face remote from the base at a right angle to the emergent rays, lenses arranged behind the said prisms and color screens disposed behind the lenses for each of the respective superimposed images.

3. In apparatus for the optical projection of colored images, the combination of two doubly reflecting prisms of the Fresnel type having the face at the base normal to the incident rays, the side faces convergently arranged to cause a double reflection, the variation of the angle between the emergent face and the base being in direct proportion to the variation required to superimpose the emergent rays and the face remote from the base at a right angle to the emergent rays, three lenses, arranged behind the plane of the said prisms, and three color screens arranged behind the respective lenses.

In testimony whereof I affix my signature in presence of two witnesses.

BENJAMIN JUMEAUX.

Witnesses:
ARTHUR DUDLEY WESTBROOK.
JOHN DUNCAN STEWART.